United States Patent
Tsuji

(10) Patent No.: US 8,193,905 B2
(45) Date of Patent: Jun. 5, 2012

(54) VEHICLE FUNCTION EXECUTION SYSTEM, VEHICLE APPARATUS, PORTABLE DEVICE, RECORDING MEDIUM, AND INFORMATION CENTER

(75) Inventor: Katsuhisa Tsuji, Hoi-gun (JP)

(73) Assignee: DENSO CORPORATION, Kariya (JP)

( * ) Notice: Subject to any disclaimer, the term of this patent is extended or adjusted under 35 U.S.C. 154(b) by 930 days.

(21) Appl. No.: 12/155,016

(22) Filed: May 29, 2008

(65) Prior Publication Data

US 2008/0309454 A1  Dec. 18, 2008

(30) Foreign Application Priority Data

Jun. 14, 2007  (JP) .................... 2007-157818

(51) Int. Cl.
*G05B 19/00* (2006.01)
(52) U.S. Cl. ............. 340/5.6; 340/5.61; 701/1; 701/36; 701/49
(58) Field of Classification Search ........... 340/5.6, 340/5.61, 5.7; 701/1, 32, 33, 35, 36, 49
See application file for complete search history.

(56) References Cited

U.S. PATENT DOCUMENTS

| | | | | |
|---|---|---|---|---|
| 6,615,123 B2 * | 9/2003 | Morehouse | | 701/49 |
| 6,665,600 B2 * | 12/2003 | Miller et al. | | 701/49 |
| 6,775,603 B2 * | 8/2004 | Yester et al. | | 701/36 |
| 6,895,316 B2 * | 5/2005 | Chen et al. | | 701/36 |
| 7,085,632 B2 | 8/2006 | Nakaya | | |
| 7,415,339 B2 * | 8/2008 | Ikeda et al. | | 701/49 |
| 2003/0204296 A1 * | 10/2003 | Galli et al. | | 701/49 |
| 2004/0044454 A1 * | 3/2004 | Ross et al. | | 701/33 |
| 2007/0299577 A1 | 12/2007 | Hattori et al. | | |

FOREIGN PATENT DOCUMENTS

JP  A-2002-120670  4/2002

OTHER PUBLICATIONS

Notification of Reason(s) for Rejection dated Sep. 29, 2009 in corresponding Japanese patent application No. 2007-157818 (and English translation).

* cited by examiner

*Primary Examiner* — Benjamin C Lee
*Assistant Examiner* — Peter Mehravari
(74) *Attorney, Agent, or Firm* — Posz Law Group, PLC

(57) ABSTRACT

A storage circuit of a portable device stores setting data concerning a function installed on a used vehicle or an in-use vehicle. Stored setting data of the portable device is read when the user gets in an in-use vehicle after use of a used vehicle. Setting data stored in the storage section of the vehicle apparatus is also read. The two read setting data are compared. When a comparison result shows a difference, execution of a function is permitted based on setting data read from the storage circuit of the portable device. The user can be notified of a function not used by the user or a new function when execution of the functions is permitted.

3 Claims, 12 Drawing Sheets

FIG. 5A  KEY ID : 00001

| FUNCTION | SETTING ITEM | FUNCTION NUMBER | SETTING VALUE : ☐ | CANCEL COUNT |
|---|---|---|---|---|
| DOOR LOCK | VEHICLE SPEED AUTOMATIC LOCK | 1001 | DISABLE/ ENABLE | 1 |
| | SHIFT-INTERLOCKED AUTOMATIC LOCK | 1002 | DISABLE /ENABLE | 3 |
| MIRROR | AUTOMATIC MIRROR | 2001 | DISABLE /ENABLE | 3 |
| | REVERSE-INTERLOCKED MIRROR | 2002 | DISABLE/ ENABLE | 0 |
| NAVIGATION | DISPLAY MODE | 3001 | 2D/ 3D | 2 |
| | AUTOMATIC REROUTING | 3002 | DISABLE/ ENABLE | 1 |
| | RAILROAD CROSSING GUIDANCE | 3003 | DISABLE /ENABLE | 0 |
| : | | | | |

FIG. 5B  KEY ID : 00001

| SCENE ITEM | CONTENT |
|---|---|
| SEASON | WINTER |
| DATE | JANUARY 1, 2007 |
| TIME | 12:30 |
| LOCATION | LONGITUDE EE DEGREES EAST, LATITUDE NN DEGREES NORTH |
| WEATHER | SNOWY |
| : | |

FIG. 5C

| FUNCTION | SETTING ITEM | FUNCTION NUMBER | VEHICLE 1 | VEHICLE 2 |
|---|---|---|---|---|
| DOOR LOCK | VEHICLE SPEED AUTOMATIC LOCK | 1001 | —(DISABLE) | DISABLE/ ENABLE |
| | SHIFT-INTERLOCKED AUTOMATIC LOCK | 1002 | —(DISABLE) | DISABLE/ ENABLE |
| MIRROR | AUTOMATIC MIRROR | 2001 | —(DISABLE) | DISABLE/ ENABLE |
| | REVERSE-INTERLOCKED MIRROR | 2002 | —(DISABLE) | DISABLE/ ENABLE |
| NAVIGATION | DISPLAY MODE | 3001 | —(2D) | 2D/ 3D |
| | AUTOMATIC REROUTING | 3002 | —(DISABLE) | DISABLE/ ENABLE |
| | RAILROAD CROSSING GUIDANCE | 3003 | —(DISABLE) | DISABLE/ ENABLE |
| : | | | | |

—: NO FUNCTION AVAILABLE

FIG. 6

| SCENE | | FUNCTION | SETTING ITEM | SETTING VALUE | CANCEL COUNT |
|---|---|---|---|---|---|
| SEASON | SUMMER | DISPLAY | COLOR TONE | COLD COLOR | 0 |
| SEASON | SUMMER | AIR CONDITIONER | SETUP TEMPERATURE | INCREASED ONE DEGREE CENTIGRADE | 3 |
| SEASON | WINTER | DISPLAY | COLOR TONE | WARM COLOR | 0 |
| SEASON | WINTER | AIR CONDITIONER | SETUP TEMPERATURE | DECREASED ONE DEGREE CENTIGRADE | 3 |
| TIME | MORNING | D SEAT | ANGLE | NORMAL | 0 |
| TIME | MORNING | TELESCOPIC STEERING COLUMN | DISTANCE | NORMAL | 0 |
| TIME | NIGHT | D SEAT | ANGLE | DECREASE | 2 |
| TIME | NIGHT | TELESCOPIC STEERING COLUMN | DISTANCE | SHORTEN | 1 |
| WEATHER | RAINY | HEADLAMP | ON/OFF | ON | 0 |
| LOCATION | MOUNTAIN TRAIL | TELESCOPIC STEERING COLUMN | DISTANCE | SHORTEN | 0 |

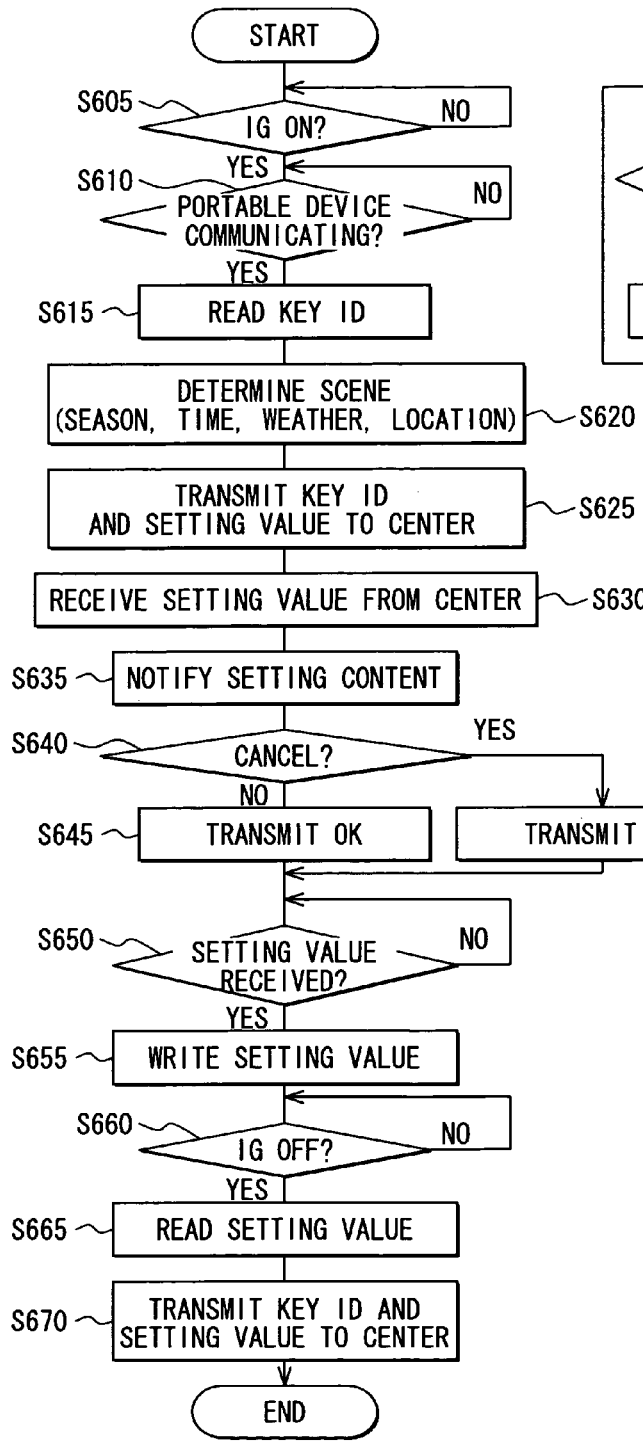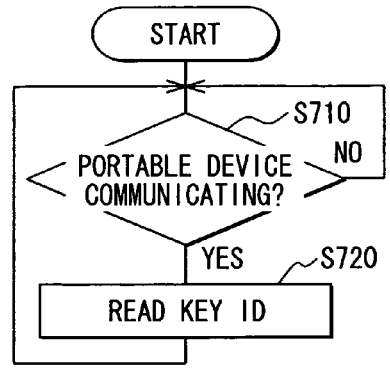
FIG. 11A
FIG. 11B

VEHICLE FUNCTION EXECUTION SYSTEM, VEHICLE APPARATUS, PORTABLE DEVICE, RECORDING MEDIUM, AND INFORMATION CENTER

CROSS REFERENCE TO RELATED APPLICATIONS

The present invention is based on and claims priority to Japanese Patent Application No. 2007-157818, filed Jun. 14, 2007, the entire contents of which are incorporated herein by reference.

BACKGROUND OF THE INVENTION

1. Field of the Invention

The present invention relates to a system for notifying a user of a function not used by the user or a new function in the system and, more particularly, a system that stores a vehicle state configured by a driver in a portable recording medium such as an IC card and enables the vehicle state for the vehicles other than the vehicle whose state is configured.

2. Description of Related Art

A conventional information provision system is known that stores a vehicle state configured by a driver in a portable recording medium such as an IC card and enables the vehicle state for the other vehicles than the vehicle whose state is configured. An information provision system of such a type inherits a vehicle state for a function that is known to and needed by a user.

An example of such a type of information provision system includes a known seamless usage environment information provision system as described for example, in JP-2002-120670 A. In accordance with the described system, an in-vehicle unit capable of using an IC card is mounted in a car. Further, a driver can assign a value to an on-board or driving condition to be stored in the IC card. The in-vehicle unit reads the value from the IC card to configure the on-board or driving condition. The driver need not configure the on-board or driving condition each time upon getting into the vehicle. The driver can adjust the on-board or driving condition of another car such as a rental car, leased car, replacement car, new car, or the like to that of their own car. More specifically, the IC card stores preset values for on-board or driving conditions the driver can specify when getting in the car. The driver inserts the IC card into the in-vehicle unit of the car to be used. The in-vehicle unit reads an on-board or driving condition value stored in the IC card. The system uses the on-board or driving condition value read from the IC card to automatically configure the on-board or driving condition to that of the IC card owner.

The above-mentioned information provision system inherits vehicle states for functions known to and needed by the user as mentioned above. When the user determines a function to be unnecessary, however, the function may be least likely to be used in the future unless it is modified so as to solve the inconvenience felt by the user. Even when the function solves the inconvenience felt by the user, the function will not be used unless the user remembers the availability of the function. Further, there may be a function that is unknown to the user or is newly added as a result of a software upgrade. Such function may be least likely to be used unless the user recognizes the availability of the function.

SUMMARY OF THE INVENTION

The present invention has been made in consideration of the foregoing. It is therefore an object of the present invention to provide a technology of notifying a user of a function not used by the user or a new function.

To solve the above noted disadvantages and provide advantages, a vehicle function execution system includes a first storage means that stores a first setting data concerning a first function associated with a previously used vehicle when coupled to the previously used vehicle. A second storage means stores a second setting data concerning a second function mounted on an in-use vehicle already used by a user after using the used vehicle. A read means reads the first setting data stored in the first storage means and the second setting data stored in the second storage means when a user gets in a vehicle. A comparison means compares the first setting data with the second setting data read by the read means. A permission means permits execution of the first function based on the first setting data read by the read means when a difference is found between the first setting data and the second setting data compared by the comparison means. In such a manner, the user can be notified of a function or of multiple functions not used by the user or a new function or multiple new functions when execution of the functions is permitted.

A notification for permitting execution of the first function is provided. Specifically, a notification control means is provided allowing a notification means to notify execution of the first function permitted by the permission means. For example, the display of the navigation system is used to visually or audibly notify a function that is permitted for execution. The user can easily recognize that the function is permitted to be performed.

The first function may be permitted in accordance with an intention of the user. There may be provided an acceptance means for accepting a user intention via an operation means. The permission means permits execution of the first function in accordance with a positive user intention accepted by the acceptance means and does not permit execution of the first function in accordance with a negative user intention accepted by the acceptance means. Such a construction makes it possible to reflect the user intention to permit execution of the first function.

When the user does not permit execution of the first function for a specified number of times, the setting data for that function may not be updated subsequently. The first storage means does not update a storage content of the first setting data when the permission means cancels execution of the first function for a specified number of times in accordance with the user intention accepted by the acceptance means. A function can be assumed to be unnecessary for the user when the function is canceled for the specified number of times. It is possible to permit execution of functions suited for user preferences and exclude unsuited ones.

After execution of the first function is permitted as mentioned above, the user may permit continuing execution of the first function. Specifically, the permission means may permit execution of the first function, then continue to permit execution of the first function in accordance with a positive user intention accepted by the acceptance means, and may not permit execution of the first function in accordance with a negative user intention accepted by the acceptance means. According to this construction, the user intention can be reflected on continued permission or cancellation of execution of the first function.

As mentioned above, the permission means may permit execution of a function that shows a difference and satisfy a specified condition when a difference is found between the first and second setting data after compared by the comparison means. Such a construction makes it possible to permit execution of functions in accordance with user preferences instead of executing all functions that contain differences.

For example, the above-mentioned specified condition may signify that a random number is greater than or equal to a specified value. A random number generation means can be provided for generating random numbers. The permission means determines that the specified condition is satisfied when a random number generated by the random number generation means is greater than or equal to a specified value. Setting a specified value can permit execution of the function with a specified probability instead of always executing the vehicle functions. For example, the first and second setting data are compared to find a function to be added. Increasing the specified value increases the probability of permitting execution of the function, effectively increasing chances of allowing the user to use the function. A newly added function needs to be tried positively. It is possible to always permit execution of the added function.

The comparison means may determine a difference between the first and second setting data even when the difference is caused by addition of a new function to either of both as a result of comparison between both. This makes it possible to allow the user to positively use a new function when added.

A function not used by the user or a new function is considered to be easily permitted when a change is made to scenario conditions such as season, time, time period, weather, and location. The above-mentioned comparison process may be performed at such timings. The comparison means compares the first setting data with second setting data when a scenario condition is changed. Instead of always executing the function, execution of a function may be permitted only when a change is made to the scenario conditions considered to easily permit execution of a function not used by the user or a new function.

The vehicle function execution system may include a vehicle apparatus mounted on a vehicle and a portable device capable of being carried by a user. The system can exchange various types of data between the vehicle apparatus and the portable device. In such a case, the vehicle apparatus includes a second storage means, a read means, a comparison means, a permission means, a notification control means, an acceptance means, and a random number generation means included in the vehicle function execution system. The portable device includes a first storage means included in the vehicle function execution system.

The above-mentioned vehicle function execution system can include a vehicle apparatus mounted on a vehicle, a portable device capable of being carried by a user, and an information center, and can exchange various types of data between the vehicle apparatus, the portable device, and the information center. In such a case, the vehicle apparatus includes a second storage means, a read means, a comparison means, a permission means, a notification control means, an acceptance means, and a random number generation means included in the vehicle function execution system. The information center includes a first storage means included in the vehicle function execution system. The vehicle apparatus may include a second storage means, a read means, a comparison means, a permission means, a notification control means, and an acceptance means included in the vehicle function execution system. The information center may include a first storage means and a random number generation means included in the vehicle function execution system.

BRIEF DESCRIPTION OF THE DRAWINGS

Other objects, features and characteristics of the present invention will be appreciated and become apparent to those of ordinary skill in the art and all of which form a part of the present application. In the drawings:

FIG. 5A is a diagram illustrating exemplary setting of data;

FIG. 5B is a diagram illustrating an exemplary scenario condition;

FIG. 5C is a diagram illustrating an exemplary selection value when a function difference exists between vehicles;

FIG. 6 is a diagram illustrating an exemplary setting change table categorized by scenarios;

FIG. 11A is a flow chart illustrating an exemplary vehicle setting value storage process;

FIG. 11B is a flow chart illustrating an exemplary portable device setting value storage process.

DETAILED DESCRIPTION OF THE EXEMPLARY EMBODIMENTS

Exemplary embodiments of the present invention will be described in further detail with reference to the accompanying drawings. The following description includes reference numbers to aid in understanding of the invention. It should be noted however that the use of reference numbers is for illustrative purposes and does not limit the claims.

First Embodiment

Figure 1:
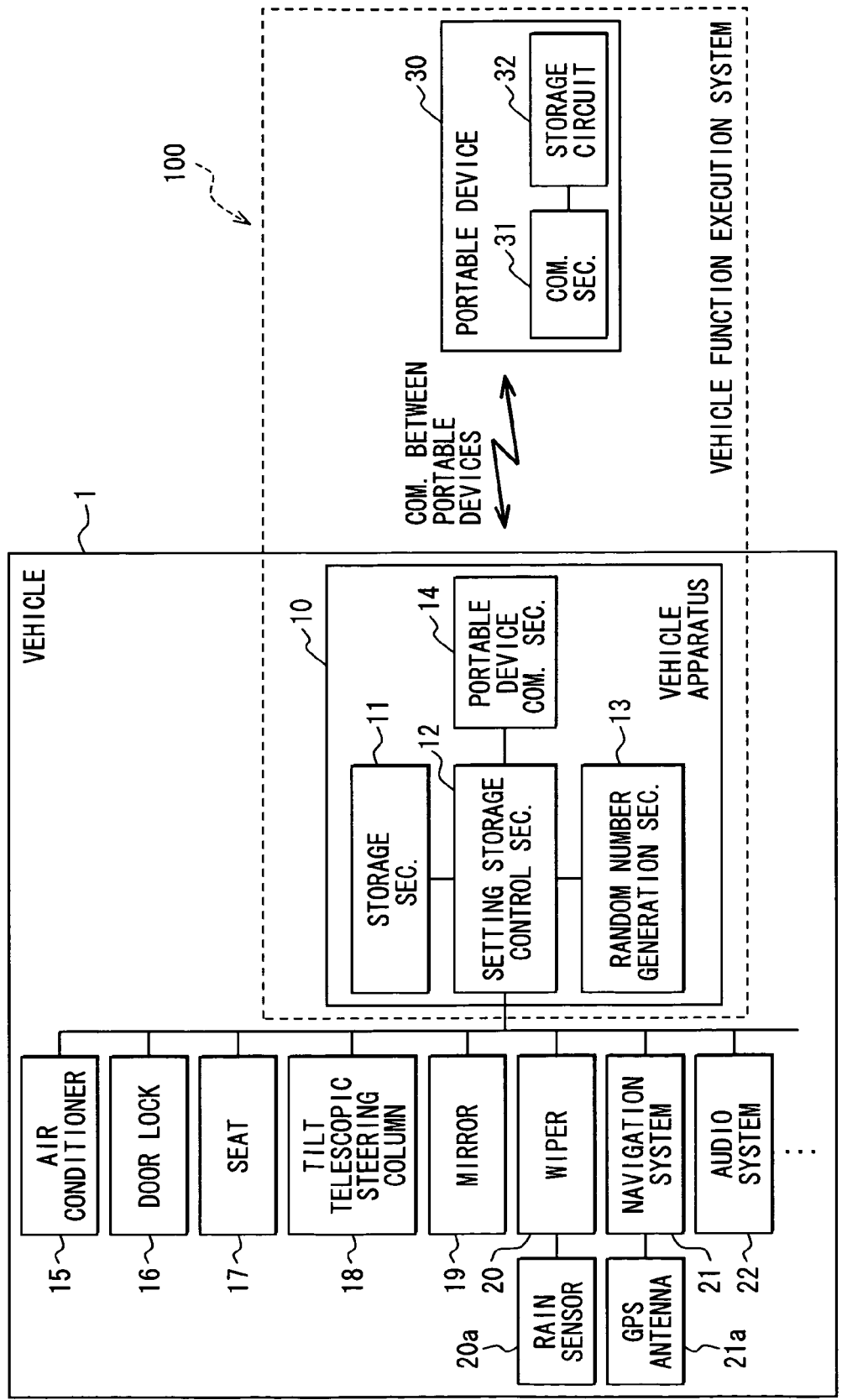
FIG. 1 is a block diagram illustrating an overall construction of a vehicle function execution system according to a first embodiment.

As shown in FIG. 1, the vehicle function execution system 100 includes a vehicle apparatus 10 mounted on a vehicle 1 and a portable device 30 a user can carry. Various data can be exchanged between the vehicle apparatus 10 and the portable device 30.

The vehicle 1 includes the vehicle apparatus 10, an air conditioner 15, a door lock 16, a seat 17, a tilt telescopic steering column 18, a mirror 19, a wiper 20, a navigation system 21, and an audio system 22. The air conditioner 15, the door lock 16, the seat 17, the tilt telescopic steering column 18, the mirror 19, the wiper 20, the navigation system 21, and the audio system 22 are connected to a setting storage control section 12 of the vehicle apparatus 10 and can exchange various data with the setting storage control section 12.

The vehicle apparatus 10 includes a storage section 11, a setting storage control section 12, a random number generation section 13, and a portable device communication section 14. The storage section 11, the random number generation section 13, and the portable device communication section 14 are connected to the setting storage control section 12 and can exchange various data therewith.

The storage section 11 includes nonvolatile memory and stores various data. Specifically, the storage section 11 stores a setting data and scenario conditions concerning functions that are installed in the vehicle 1 to be used. As shown in FIG. 5A, the setting data contains a record of a function, a setting item, a function number, a setting value, and a cancellation count associated with each other. For example, the setting data contains a record of the function "door lock," the setting item "vehicle speed automatic lock," the function number "1001," the setting value "enabled," and the cancellation count "1" associated with each other. The setting data is assigned with a key ID. As shown in FIG. 5B, the scenario condition contains information indicating the present season, time, weather, and location. As an example, the present season is winter. The date and the time are 12:30 on Jan. 1, 2007. The present location is at longitude EE degrees east and latitude NN degrees north. The weather is snowy. The scenario condition is assigned with a key ID. The storage section 11 can be referred to as a second storage means. The setting data stored in the storage section 11 can be referred to as "second setting data," for example as recited in the appended claims. The function contained in the setting data can be called a "second function," for example as recited in the appended claims.

The setting storage control section 12 is mainly constructed as a known microcomputer including a CPU, ROM, RAM, SRAM, I/O, and a bus line connecting the described components. The setting storage control section 12 performs various processes based on programs that are stored in the ROM and the RAM. Based on a setting value for each function assigned to the setting data stored in the storage section 11, the setting storage control section 12 permits control of the components such as the air conditioner 15 other than the vehicle apparatus 10 provided for the vehicle 1. For example, the setting data specifies the door lock function such that the "vehicle speed automatic lock" as the setting item is shown as being in an "enabled" status. When the vehicle 1 reaches a specified speed, the setting storage control section 12 permits the door lock 16 to lock the doors of the vehicle 1. The setting storage control section 12 can be referred to as a read means, a comparison means, a permission means, a notification control means, and an acceptance means.

The random number generation section 13 generates and outputs random numbers. The random number generation section 13 can function as a random number generation means. The portable device communication section 14 communicates with a communication section 31 of the portable device 30. The functions of the following in-vehicle units, other than the vehicle apparatus 10, can be registered to the above-mentioned setting data. Such functions include the door lock, which is unlocked when operated twice, navigation setting display method function, audio system setting such as a surround setting, and air conditioner setting such as an ion generation setting.

The air conditioner 15 includes a compressor, a heater, a fan, and the like. In accordance with specified operation settings, the air conditioner 15 adjusts the temperature, humidity, cleanliness factor, and the like, in the vehicle. Further, the air conditioner 15 outputs signals indicating drive settings and signals indicating results of the temperature, humidity, cleanliness factor, in the vehicle.

The door lock 16 locks a door in accordance with a passenger operation. The door lock 16 outputs a signal indicating its own state.

The seat 17 includes an approximately square seat portion for a user to sit and a seat back rest that is provided at the rear end of the seat portion and can be tilted backward. The seat 17 can be electrically adjusted with respect to its positions in the front-back direction and angles of the seat back rest. The seat 17 outputs position information in terms of positions in the front-back direction and angles of the seat back rest.

The tilt telescopic steering column 18 acquires and outputs adjustment positions as steering wheel position information based on vertical angles and a telescopic amount in an axial direction.

The mirror 19 represents an interior rearview mirror provided in the vehicle and detects and outputs adjustment angles such as vertical and horizontal angles for the rearview mirror.

Based on an output signal from a rain sensor 20a, the wiper 20 automatically operates in accordance with the weather. The wiper 20 detects and outputs its own operating states and speeds.

The navigation system 21 is an electronic control apparatus mainly including a navigation electronic control unit (ECU), a global positioning system (GPS) receiver, and DVD-ROM. The GPS receiver receives a radio wave from an artificial GPS satellite, such as via a GPS antenna 21a, and outputs the received signal. The DVD-ROM records a map database. The navigation system 21 specifies a location of the vehicle on the map and performs processes such as route guidance. The navigation system 21 includes a display section (not shown) and an operation section (not shown). The display section can display various information elements. The operation section is used for user operations. The navigation system 21 outputs various computation results. The navigation system 21 can function as a notification means and an operation means.

The audio system 22 includes a signal switch, a signal amplifier, and the like. The audio system 22 amplifies an input audio signal, which is then output to an external speaker (not shown). The audio system 22 outputs a signal indicating an output level.

The portable device 30 includes a communication section 31 and a storage circuit 32. The communication section 31 and the storage circuit 32 are connected to each other and can exchange various types of data.

The communication section 31 communicates with the portable device communication section 14 of the vehicle apparatus 10.

The storage circuit 32 includes a nonvolatile memory and stores various types of data such as a setting data concerning functions installed in a vehicle, such as a used vehicle, that the user has used in the past. The setting data contains a record of the function, the setting item, the function number, the setting value, and the cancellation count associated with each other. The setting data is assigned with the key ID. The storage circuit 32 reads the setting data to be stored and updates it. The storage circuit 32 can be referred to as a first storage means. The setting data stored in the storage circuit 32 can be referred to as a "first setting data" as recited, for example, in the claims. A function registered to the setting data can be referred to as a "first function" as recited, for example, in the claims. The portable device 30 can be referred to as a recording medium.

Figure 3:
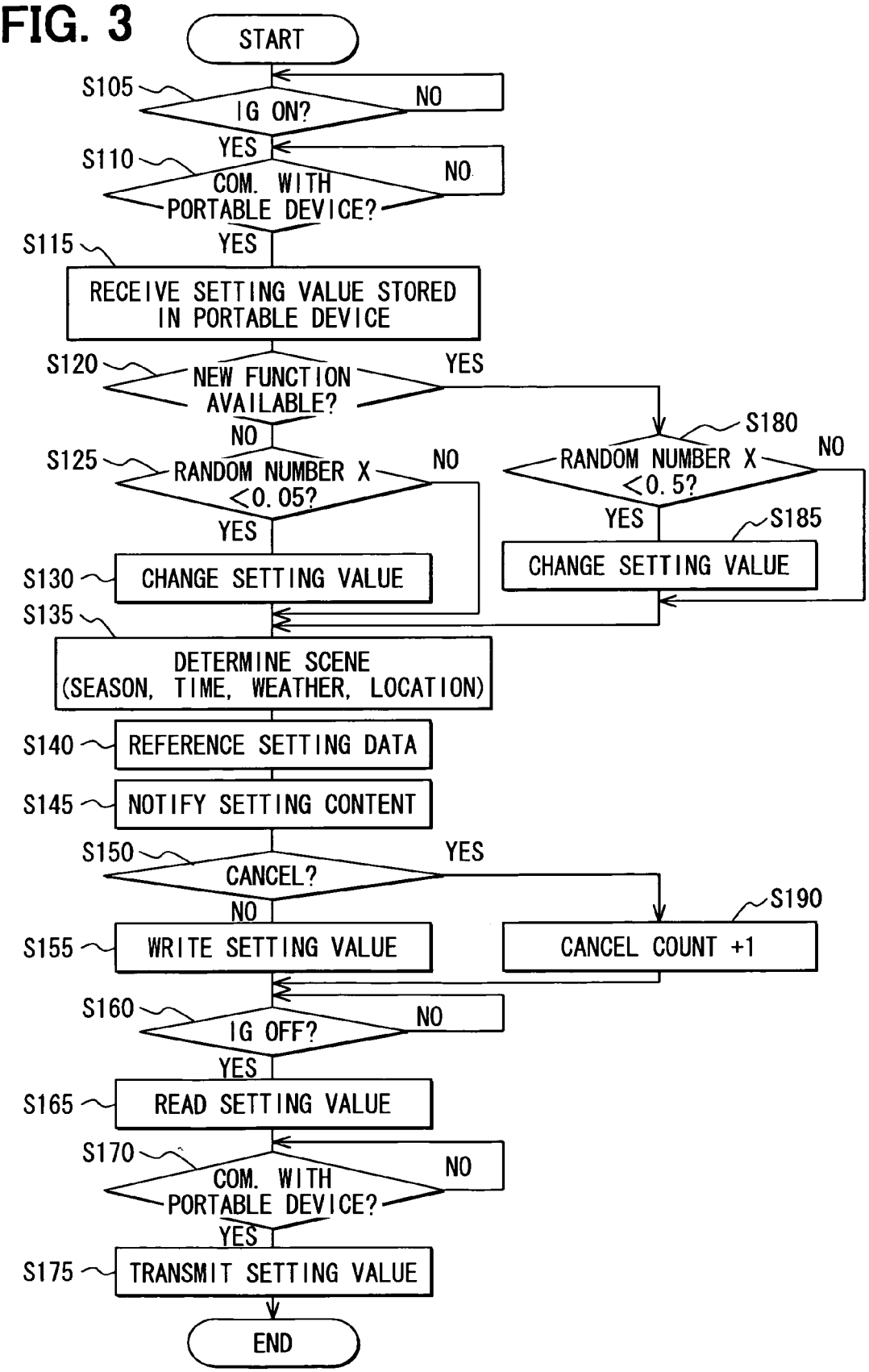
FIG. 3 is a flow chart illustrating an exemplary vehicle setting value storage process.

The following describes a vehicle setting value storage process performed by the setting storage control section 12 of the vehicle apparatus 10 with reference to a flow chart in FIG. 3. The value storage process is repeated when the vehicle apparatus 10 is turned on.

When the ignition is determined to be turned off, corresponding to NO at S105, the process waits until the ignition is determined to be turned on. When the ignition is determined to be turned on, corresponding to YES at S105, the process determines whether the vehicle apparatus 10 is communicating with the portable device 30 at S110. When the vehicle apparatus 10 is determined not to communicate with the portable device 30, corresponding to NO at S110, the process waits until the vehicle apparatus 10 is determined to communicate with the portable device 30. When the vehicle apparatus 10 is determined to communicate with the portable device 30, corresponding to YES at S110, the process receives a setting value or setting data, for example, as shown in FIG. 5A, from the portable device 30 at S115. The setting data is stored in the storage circuit 32 of the portable device 30. The process references the received setting data and determines whether the setting data contains a new function concerning the various in-vehicle units at S120.

When it is determined that no new function is available for the in-vehicle units, corresponding to NO at S120, the process proceeds to S125 and determines whether random number X generated by the random number generation section 13 is smaller than 0.05. When random number X is smaller than 0.05, corresponding to YES at S125, the process references the setting data received from the portable device 30 and changes the targeted part of the setting data stored in the storage section 11 at S130, as shown for example, in FIG. 5A. Specifically, the process compares two pieces of the read setting data. When a comparison result shows a difference between both, the process generates setting data by combining the two pieces of setting data, as shown for example, in FIG. 5C. The process references the generated setting data and changes the targeted part of the setting data stored in the storage section 11. The process permits execution of the function based on the setting data read from the storage circuit 32 of the portable device 30. For example, the setting data in FIG. 5C shows that the vehicle speed automatic lock function is not installed in a used vehicle, for example, under the column "vehicle 1" in FIG. 5C. The function is installed as a new one in an in-use vehicle as can be seen, for example, under the column "vehicle 2" in FIG. 5C. The setting value "disabled" or "enabled" can be selected. The display method of the navigation system 21 is "2D" for a used vehicle as can be seen, for example, under the column "vehicle 1" in FIG. 5C. The display method "3D" is installed as a new function in an in-use vehicle as can be seen, for example, under the column "vehicle 2" in FIG. 5C. The setting value "2D" or "3D" can be selected. The process then proceeds to S135. When random number X generated by the random number generation section 13 is greater than or equal to 0.05, corresponding to NO at S125, the process jumps to S135.

When it is determined that no new function is available for the in-vehicle units, corresponding to NO at S120, the process proceeds to S125 and determines whether random number X generated by the random number generation section 13 is smaller than 0.05. When random number X is smaller than 0.05, corresponding to YES at S125, the process references the setting data received from the portable device 30 and changes a targeted part of the setting data stored in the storage section 11 at S130, as shown for example, in FIG. 5A. Specifically, the process compares the two pieces of the setting data which were read (collectively, "read setting data"). When a comparison result shows a difference between both, the process generates combined setting data by combining the two pieces of setting data, as shown for example, in FIG. 5C. The process references the combined setting data which was generated ("generated setting data") and changes the targeted part of the setting data stored in the storage section 11. The process permits execution of the function based on the setting data read from the storage circuit 32 of the portable device 30. For example, the setting data in FIG. 5C shows that the vehicle speed automatic lock function is not installed in a used vehicle, for example, under the column "vehicle 1" in FIG. 5C. The function is installed as a new one in an in-use vehicle as can be seen, for example, under the column "vehicle 2" in FIG. 5C. The setting value "disabled" or "enabled" can be selected. The display method of the navigation system 21 is "2D" for a used vehicle as can be seen, for example, under the column "vehicle 1" in FIG. 5C. The display method "3D" is installed as a new function in an in-use vehicle as can be seen, for example, under the column "vehicle 2" in FIG. 5C. The setting value "2D" or "3D" can be selected. The process then proceeds to S135. When random number X generated by the random number generation section 13 is greater than or equal to 0.05, corresponding to NO at S125, the process jumps to S135.

Figure 2:
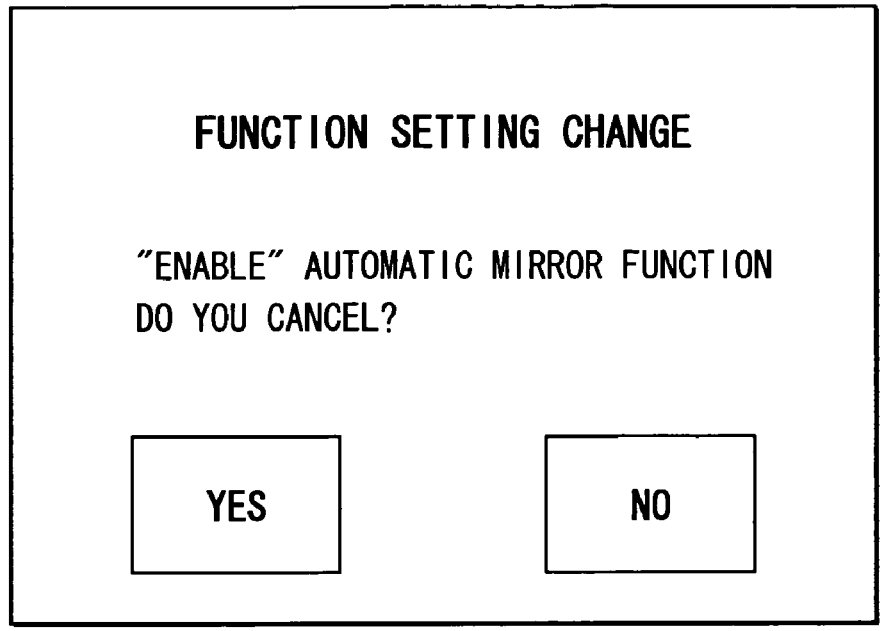
FIG. 2 is a diagram illustrating an exemplary notification of a setting value.

At S135, the process references the scenario condition, for example, as shown in FIG. 5B, stored in the storage section 11 and determines scenarios such as season, time, weather, and location. As an example, the present season is winter. The date and the time are 12:30 on Jan. 1, 2007. The present location is at longitude EE degrees east and latitude NN degrees north. The weather is snowy. The process then references the setting data stored in the storage section 11 at S140 and notifies of the setting content at S145. Specifically, a display of the navigation system 21 is used to provide a visual or audible notification of the setting content as being a function that is permitted for execution. The process determines whether or not to cancel the setting change at S150. As shown in FIG. 2, a display apparatus of the navigation system 21 displays a notification for determining whether to cancel the setting change in functions such as an automatic mirror function, for example. The process accepts a result of the determination by the user whether or not to cancel the setting change. Based on the accepted user selection result, the process determines whether to cancel the setting change. When it is determined that the setting change is canceled, corresponding to YES at S150, the process increments the cancellation count for the corresponding setting item by 1 at S190, as shown in FIG. 5A, and proceeds to S160. When it is determined that the setting change is not canceled, corresponding to NO at S150, the process writes the targeted part of the setting data stored in the storage section 11 at S155 and proceeds to S160.

At S160, the process determines whether the ignition turns off. When the ignition is determined to be turned on, corresponding to NO at S160, the process waits until the ignition is determined to be turned off. When the ignition is determined to be turned off, corresponding to YES at S160, the process reads the setting data at S165.

The process determines whether the vehicle apparatus 10 is communicating with the portable device 30 at S170. When the vehicle apparatus 10 is determined not to communicate with the portable device 30, corresponding to NO at S170, the process waits until the vehicle apparatus 10 is determined to communicate with the portable device 30. When the vehicle apparatus 10 is determined to communicate with the portable device 30, corresponding to YES at S170, the process returns the previously read setting data to the portable device 30 at S115. The process then terminates.

Figure 4:
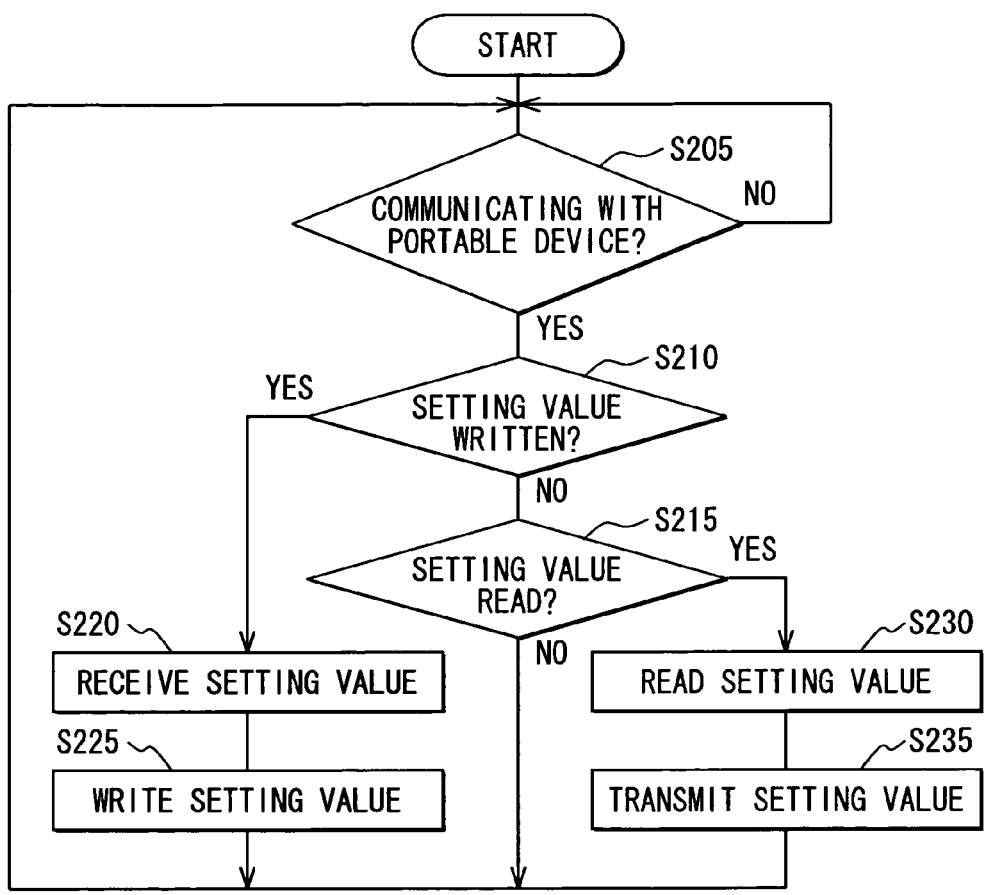
FIG. 4 is a flow chart illustrating an exemplary device setting value storage process.

A portable device setting value storage process performed by the portable device 30 with reference to a flow chart in FIG. 4 is performed when the portable device 30 is turned on. When it is determined that the portable device 30 does not communicate with the vehicle apparatus 10, corresponding to NO at S205, the process waits until the portable device 30 is determined to communicate with the vehicle apparatus 10. When it is determined that the portable device 30 communicates with the vehicle apparatus 10, corresponding to YES at S205, the process determines whether setting data is written to the vehicle apparatus 10 at S210. When it is determined that setting data is written to the vehicle apparatus 10, corresponding to YES at S210, the process receives the updated setting data from the vehicle apparatus 10 at S220. The process writes the updated and received setting data to the setting data stored in the storage circuit 32 at S225 and returns to S205.

When it is determined that no setting data is written to the vehicle apparatus 10, corresponding to NO at S210, the process determines whether to read setting data from the portable device 30 at S215. When it is determined that setting data is read from the portable device 30, corresponding to YES at S215, the process reads the setting data stored in the storage circuit 32 at S230 and transmits the read setting data to the vehicle apparatus 10 at S235. The process then returns to S205. The process also returns to S205 when it is determined that no setting data is read from the portable device 30, corresponding to NO at S215.

The vehicle function execution system 100 according to the first embodiment can provide the following effects. The storage circuit 32 of the portable device 30 stores the first setting data, that is, the setting data concerning a first function to be installed on a used vehicle. The storage section 11 of the vehicle apparatus 10 stores the second setting data, that is, the setting data concerning a second function to be installed on an in-use vehicle. The setting storage control section 12 of the vehicle apparatus 10 reads setting data stored in the storage circuit 32 of the portable device 30 when a user gets into the in-use vehicle after using the used vehicle. The setting storage control section 12 also reads the setting data stored in the storage section 11 of the vehicle apparatus 10. The setting storage control section 12 compares two pieces of the read setting data. When a comparison result shows a difference between both, the setting storage control section 12 permits execution of the function based on the setting data read from the storage circuit 32 of the portable device 30. The setting storage control section 12 can permit execution of a function not used by the user or a new function to notify these functions to the user.

In the vehicle function execution system 100 according to the first embodiment, the vehicle setting value storage process updates a targeted part of the setting data stored in the storage section 11 at S130 or S185. The process references the setting data stored in the storage section 11 at S140 and notifies the setting content at S145. The display of the navigation system 21 is used to provide a visual or audible notification of a function that is permitted for execution such that the user can easily recognize that the function is permitted to be performed.

In the vehicle function execution system 100 according to the first embodiment, the vehicle setting value storage process causes the display apparatus of the navigation system 21 to display a notification for determining whether to cancel the setting change in functions such as the automatic mirror function, for example. The process accepts a result of the user selection whether to cancel the setting change. Based on the accepted user selection, the process determines whether to cancel the setting change at S150. When it is determined that the setting change is canceled, corresponding to YES at S150, the process increments the cancellation count for the corresponding setting item by 1 at S190, see FIG. 5A. When it is determined that the setting change is not canceled, corresponding to NO at S150, the process writes the targeted part of the setting data stored in the storage section 11 at S155, making it possible to reflect the intention of the user to permit execution of the vehicle functions.

In the vehicle function execution system 100 according to the first embodiment, the vehicle setting value storage process compares two elements of setting data. When a comparison result shows a difference between both data elements, the process performs a function that shows the difference and satisfies a specified condition. In such a case, the specified condition is satisfied when a random number generated by the random number generation section 13 is greater than or equal to a specified value as will be described below.

The process determines that no new function is available for the in-vehicle units, corresponding to NO at S120. When random number X generated by the random number generation section 13 is smaller than 0.05, corresponding to YES at S125, the process changes the targeted part of the setting data stored in the storage section based on the setting data received from the portable device 30 at S130, as shown for example, in FIG. 5A.

The process determines that a new function is available for the in-vehicle units, corresponding to YES at S120. When random number X generated by the random number generation section 13 is smaller than 0.5, corresponding to YES at S180, the process changes the targeted part of the setting data stored in the storage section 11 based on the setting data received from the portable device 30 at S185, as shown, for example, FIG. 5A.

It is possible to permit execution of functions in accordance with user preferences instead of executing all functions that contain differences. Setting a specified value can permit execution of the function with a specified probability instead of always executing the vehicle functions. For example, two pieces of setting data are compared to find a function to be added. Increasing the specified value increases the probability of permitting execution of the function, effectively increasing chances of allowing the user to use the function. A newly added function needs to be tried positively. It is possible to always permit execution of the added function.

In the vehicle function execution system 100 according to the first embodiment, the vehicle setting value storage process determines a new function for the in-vehicle units, corresponding to YES at S120. The process compares the two pieces of the read setting data when random number X generated by the random number generation section 13 is smaller than 0.5, corresponding to YES at S180. When a comparison result shows a new function added to either of the two, the process determines a difference between both. When a difference is determined between both, the process generates setting data by combining the two pieces of the setting data as shown for example, in FIG. 5C. The process changes the targeted part of the setting data stored in the storage section 11 based on the generated setting data. In such a manner, the process permits execution of the functions including the new one based on the setting data read from the storage circuit 32 of the portable device 30, making it possible to allow the user to positively use a new function when added.

In the vehicle function execution system 100 according to the first embodiment, the vehicle setting value storage process references the scenario conditions, as shown in FIG. 5B, that are stored in the storage section at S135 to determine scenarios such as season, time, weather, and location. When the scenario condition is changed, the process compares the two elements of setting data. Instead of always executing the vehicle functions, execution thereof can be permitted only when a change is made to the scenario condition that seems to easily permit execution of a function not used by the user or a new function.

Second Embodiment

The vehicle function execution system 100 according to the first embodiment includes the vehicle apparatus 10 mounted on the vehicle 1 and the portable device 30 that the user can carry. The vehicle apparatus 10 and the portable device 30 can exchange various types of data. On the other hand, a vehicle function execution system 200 according to a second embodiment includes a vehicle apparatus 40 mounted on a vehicle 2, a portable device 30 the user can carry, and an information center 50. The vehicle apparatus 40, the portable device 30, and the information center 50 can exchange various types of data.

Figure 7:
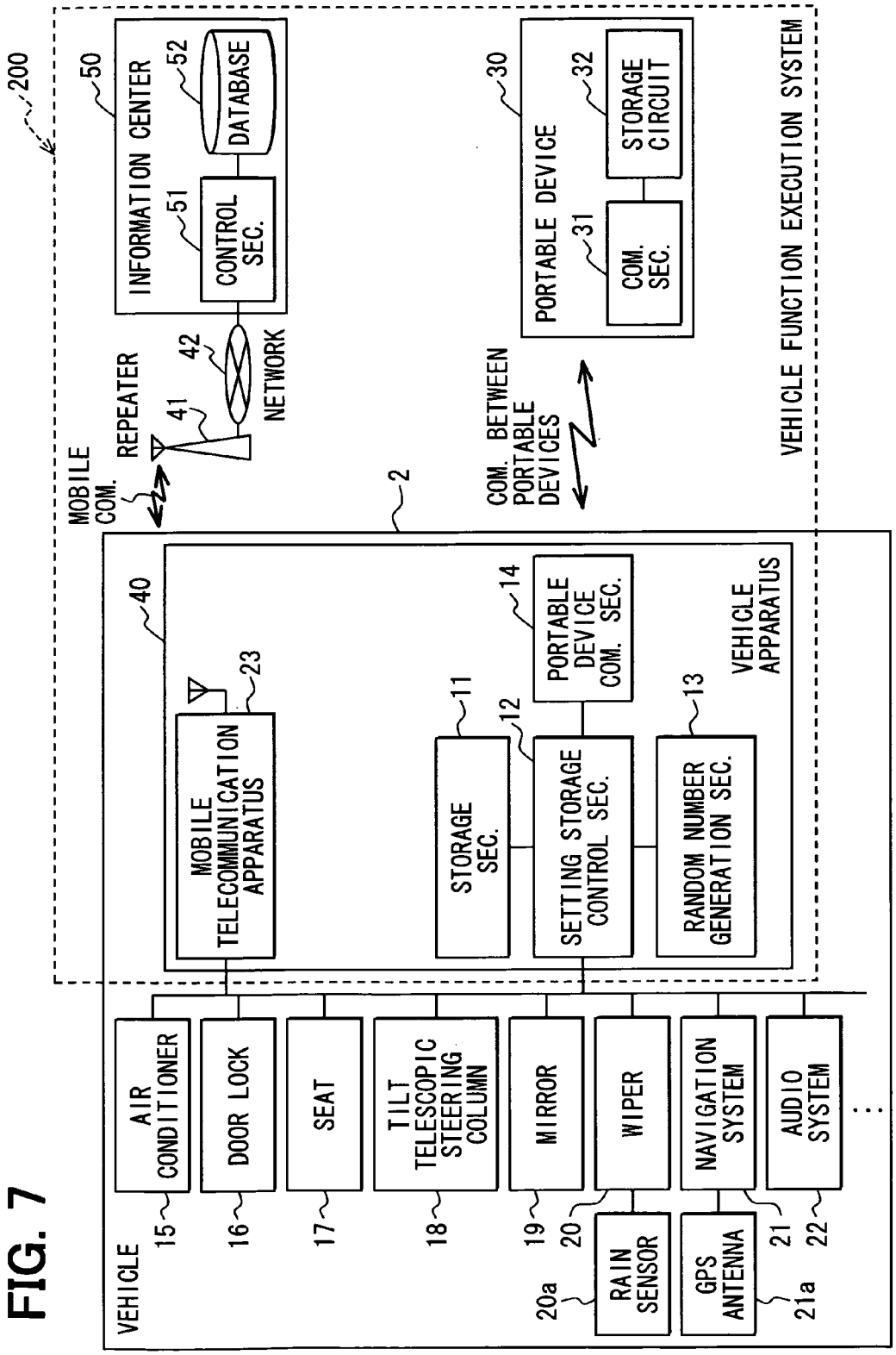
FIG. 7 is a block diagram illustrating an exemplary overall construction of a vehicle function execution system according to a second embodiment.

The following describes a construction of the vehicle function execution system 200 according to the second embodiment. FIG. 7 is a block diagram showing an overall construction of the vehicle function execution system 200 according to the second embodiment.

Many parts of the second embodiment are common to the first embodiment. The mutually corresponding parts in the first and second embodiments are designated by the same reference numerals and a detailed description is omitted for simplicity.

The vehicle 2 includes the vehicle apparatus 40, the air conditioner 15, the door lock 16, the seat 17, the tilt telescopic steering column 18, the mirror 19, the wiper 20, the navigation system 21, and the audio system 22. The air conditioner 15, the door lock 16, the seat 17, the tilt telescopic steering column 18, the mirror 19, the wiper 20, the navigation system 21, and the audio system 22 are individually connected to the setting storage control section 12 of the vehicle apparatus 40 and can exchange various types of data with the setting storage control section 12.

The vehicle apparatus 40 includes the storage section 11, the setting storage control section 12, the random number generation section 13, the portable device communication section 14, and a mobile telecommunication apparatus 23. The storage section 11, the random number generation section 13, the portable device communication section 14, and a mobile telecommunication apparatus 23 are connected to the setting storage control section 12 and can exchange various types of data with the setting storage control section 12. The mobile telecommunication apparatus 23 communicates with a control section 51 of the information center 50 via a repeater 41 and a network 42.

The portable device 30 includes the communication section 31 and the storage circuit 32. The communication section 31 and the storage circuit 32 are connected to each other and can exchange various types of data.

The information center 50 manages information such as a history of purchase, drinking, and eating of the driver. The information center 50 includes the control section 51 and a database 52. The control section 51 and a database 52 are connected to each other and can exchange various types of data.

The control section 51 is mainly constructed as a known microcomputer including a CPU, ROM, RAM, SRAM, I/O, and a bus line connecting these components. The control section 12 performs various processes based on programs stored in the ROM and the RAM. The control section 51 communicates with the mobile telecommunication apparatus 23 of the vehicle apparatus 10 via the repeater 41 and the network 42.

The database 52 includes nonvolatile memory and stores various types of data such as the setting data concerning functions installed in a vehicle such as a used vehicle that the user has used in the past. As shown in FIG. 5A, the setting data contains a record of the function, the setting item, the function number, the setting value, and the cancellation count associated with each other. The setting data is assigned with the key ID. According to the present embodiment, setting data stored in the storage circuit 52 can function as "first setting data" as recited in the claims. A function registered to the setting data can function as a "first function" as recited in the claims. The database 52 can function as the first storage means according to the embodiment.

Figure 8:
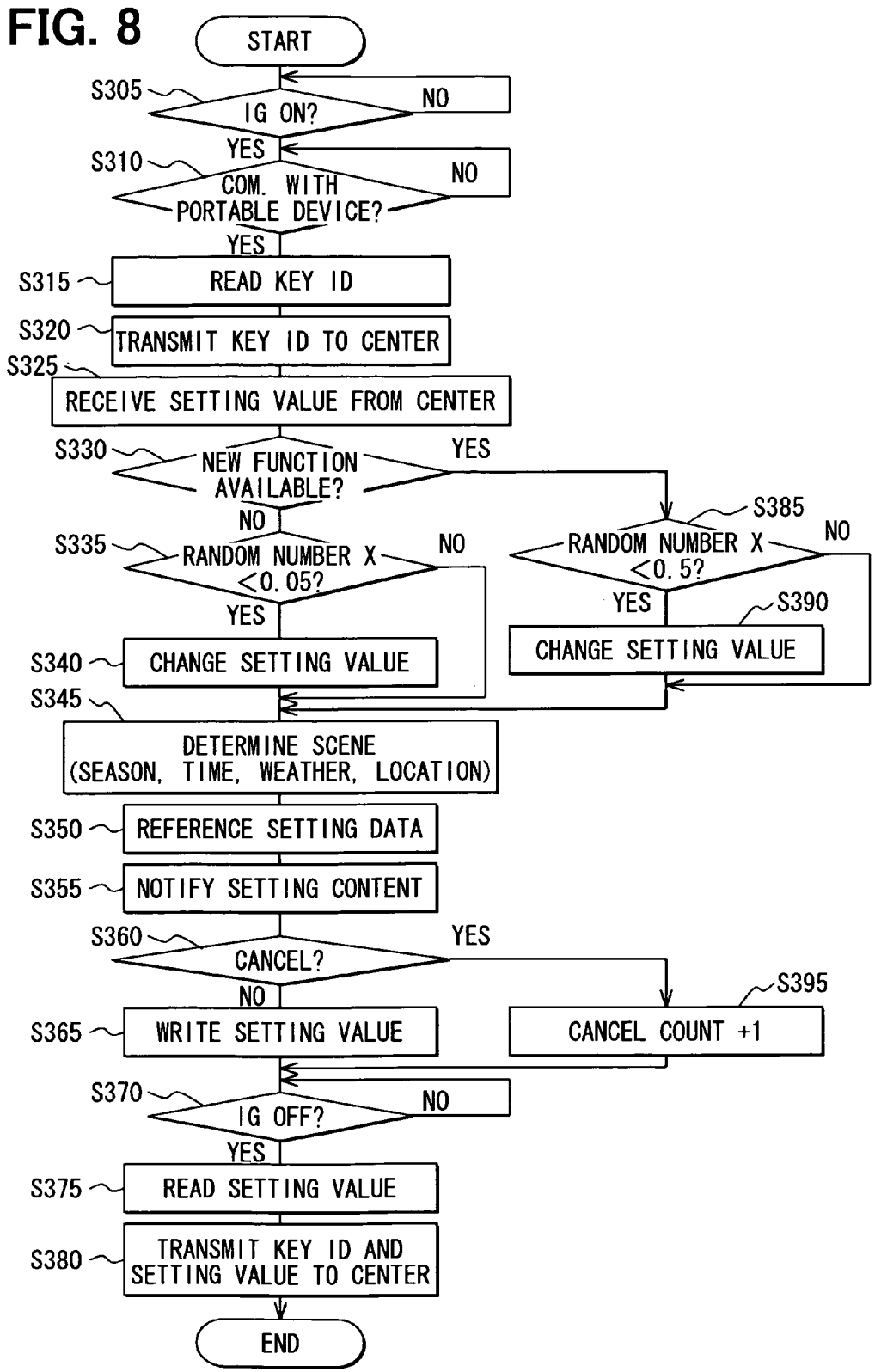
FIG. 8 is a flow chart illustrating a vehicle setting value storage process.

The following describes a vehicle setting value storage process performed by the setting storage control section 12 of the vehicle apparatus 40 with reference to a flow chart in FIG. 8. The process is repeated when the vehicle apparatus 40 is turned on.

The process determines whether an ignition turns on at S305. When the ignition is determined to be turned off, corresponding to NO at S305, the process waits until the ignition is determined to be turned on. When the ignition is determined to be turned on, corresponding to YES at S305, the process determines whether the vehicle apparatus 10 is communicating with the portable device 30 at S310. When the vehicle apparatus 10 is determined not to communicate with the portable device 30, corresponding to NO at S310, the process waits until the vehicle apparatus 10 is determined to communicate with the portable device 30. When the vehicle apparatus 10 is determined to communicate with the portable device 30, corresponding to YES at S310, the process reads the key ID at S315. Specifically, the process receives the key ID from the portable device 30. The key ID is contained in the setting data stored in the storage circuit 32 of the portable device 30. The process transmits the read ID to the information center 50 at S320. Further, the process receives a setting value or setting data, as shown for example, in FIG. 5A, from the information center 50 at S325. The setting data is stored in the database 52 of the information center 50. The process references the received setting data and determines whether the setting data contains a new function concerning the various in-vehicle units at S330.

When it is determined that no new function is available for the in-vehicle unit, corresponding to NO at S330, the process proceeds to S335 and determines whether random number X generated by the random number generation section 13 is smaller than 0.05. When random number X is smaller than 0.05, corresponding to YES at S335, the process references the setting data received from the portable device 30 and changes the targeted part of the setting data stored in the storage section 11 at S340, see FIG. 5A. Specifically, the process compares two pieces of the read setting data. When a comparison result shows a difference between both, the process generates setting data by combining the two elements of setting data as shown, for example, in FIG. 5C. The process references the generated setting data and changes the targeted part of the setting data stored in the storage section 11. The process permits execution of the function based on the setting data read from the storage circuit 32 of the portable device 30. The process then proceeds to S345. When random number X generated by the random number generation section 13 is greater than or equal to 0.05, corresponding to NO at S335, the process jumps to S345.

When it is determined that a new function is available for the in-vehicle units, corresponding to YES at S330, the process proceeds to S385 to determine whether random number X generated by the random number generation section 13 is smaller than 0.5. When random number X is smaller than 0.5, corresponding to YES at S385, the process references the setting data received from the portable device 30 and changes the targeted part of the setting data stored in the storage section 11 at S390, as shown, for example, in FIG. 5A. Specifically, the process compares two pieces of the read setting data. When a comparison result shows a difference between both, the process determines that a new function is added to either. The process generates setting data by combining the two pieces of setting data as shown for example, in FIG. 5C, when a difference is determined between both including addition of the new function. The process references the generated setting data and changes the targeted part of the setting data stored in the storage section 11. The process permits execution of the functions including the new function based on the setting data read from the storage circuit 32 of the portable device 30. The process proceeds to S335. When random number X generated by the random number generation section 13 is greater than or equal to 0.5, corresponding to NO at S385, the process jumps to S345.

At S345, the process references the scenario condition, as shown for example, in FIG. 5B, stored in the storage section 11 and determines scenarios such as season, time, weather, and location. As an example, the present season is winter. The date and the time are 12:30 on Jan. 1, 2007. The present location is at longitude EE degrees east and latitude NN degrees north. The weather is snowy. The process then references the setting data stored in the storage section 11 at S350 and notifies the setting content at S355. Specifically, a display of the navigation system 21 is used to provide, as the setting content, a visual or audible notification that a function is permitted for execution. The process determines whether to cancel the setting change at S360. As shown in FIG. 2, a display apparatus of the navigation system 21 displays a notification for determining whether to cancel the setting change in functions such as an automatic mirror function, for example. The process accepts a result of the determination by the user whether to cancel the setting change. Based on the accepted user selection result, the process determines whether to cancel the setting change. When it is determined that the setting change is canceled, corresponding to YES at S360, the process increments the cancellation count for the corresponding setting item by 1 at S395, as shown for example, in FIG. 5A, and proceeds to S370. When it is determined that the setting change is not canceled, corresponding to NO at S360, the process writes the targeted part of the setting data stored in the storage section 11 at S365 and proceeds to S370.

At S370, the process determines whether the ignition turns off. When the ignition is determined to be turned on, corresponding to NO at S370, the process waits until the ignition is determined to be turned off. When the ignition is determined to be turned off, corresponding to YES at S370, the process reads the setting data at S375. The process transmits the key ID and the setting data to the information center 50 at S380. The process then terminates.

Figure 9A:
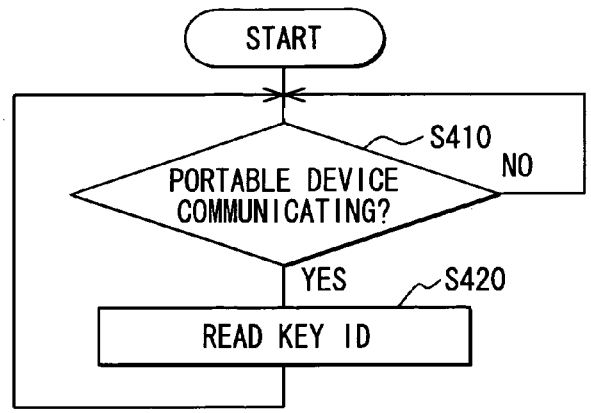
FIG. 9A is a flow chart illustrating a portable device setting value storage process.

The following describes a portable device setting value storage process performed by the portable device 30 with reference to a flow chart in FIG. 9A. The process 2 is performed when the portable device 30 is turned on. The process determines whether the portable device 30 communicates with the vehicle apparatus 10 at S410. When it is determined that the portable device 30 does not communicate with the vehicle apparatus 10, corresponding to NO at S410, the process waits until the portable device 30 is determined to communicate with the vehicle apparatus 10. When it is determined that the portable device 30 communicates with the vehicle apparatus 10, corresponding to YES at S410, the process reads the key ID contained in the setting data stored in the storage circuit 32. The process transmits the read key ID to the vehicle apparatus 10 at S420. The process then returns to S410.

Figure 9B:
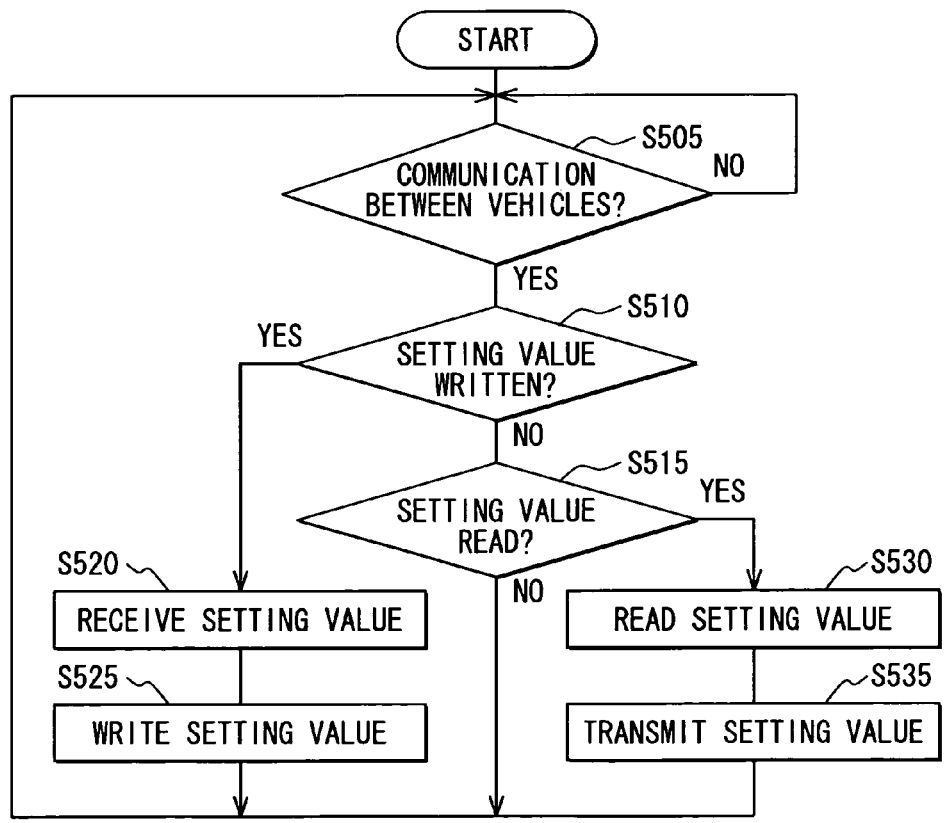
FIG. 9B is a flow chart illustrating a center setting value storage process.

The following describes a center setting value storage process performed by the control section 51 of the information center 50 with reference to a flow chart in FIG. 9B. The process is performed when the information center 50 is turned on. When it is determined that the information center 50 does not communicate with the vehicle apparatus 10, corresponding to NO at S505, the process waits until the information center 50 is determined to communicate with the vehicle apparatus 10. When it is determined that the information center 50 communicates with the vehicle apparatus 10, corresponding to YES at S505, the process determines whether setting data is written to the vehicle apparatus 10 at S510. When it is determined that setting data is written to the vehicle apparatus 10, corresponding to YES at S510, the process receives the updated setting data from the vehicle apparatus 10 at S520. The process writes the received updated setting data to the setting data stored in the database 52 at S525 and returns to S505.

When it is determined that no setting data is written to the vehicle apparatus 10, corresponding to NO at S510, the process determines whether to read setting data from the information center 50 at S515. When it is determined that setting data is read from the information center 50, corresponding to YES at S515, the process reads the setting data from the database 52 at S530 and transmits the read setting data to the vehicle apparatus 10 at S535. The process then returns to S505. The process also returns to S505 when it is determined that no setting data is read from the information center 50, corresponding to NO at S515.

It should be noted that the vehicle function execution system 200 according to the second embodiment provides the same effects as those provided by the vehicle function execution system 100 according to the first embodiment.

Third Embodiment

As described above, in the vehicle function execution system 200 according to the second embodiment, the vehicle apparatus 40 includes the random number generation section 13. In the vehicle function execution system 300 according to the third embodiment, the random number generation section 13 is included in the information center 50 rather than in the vehicle apparatus 60.

Figure 10:
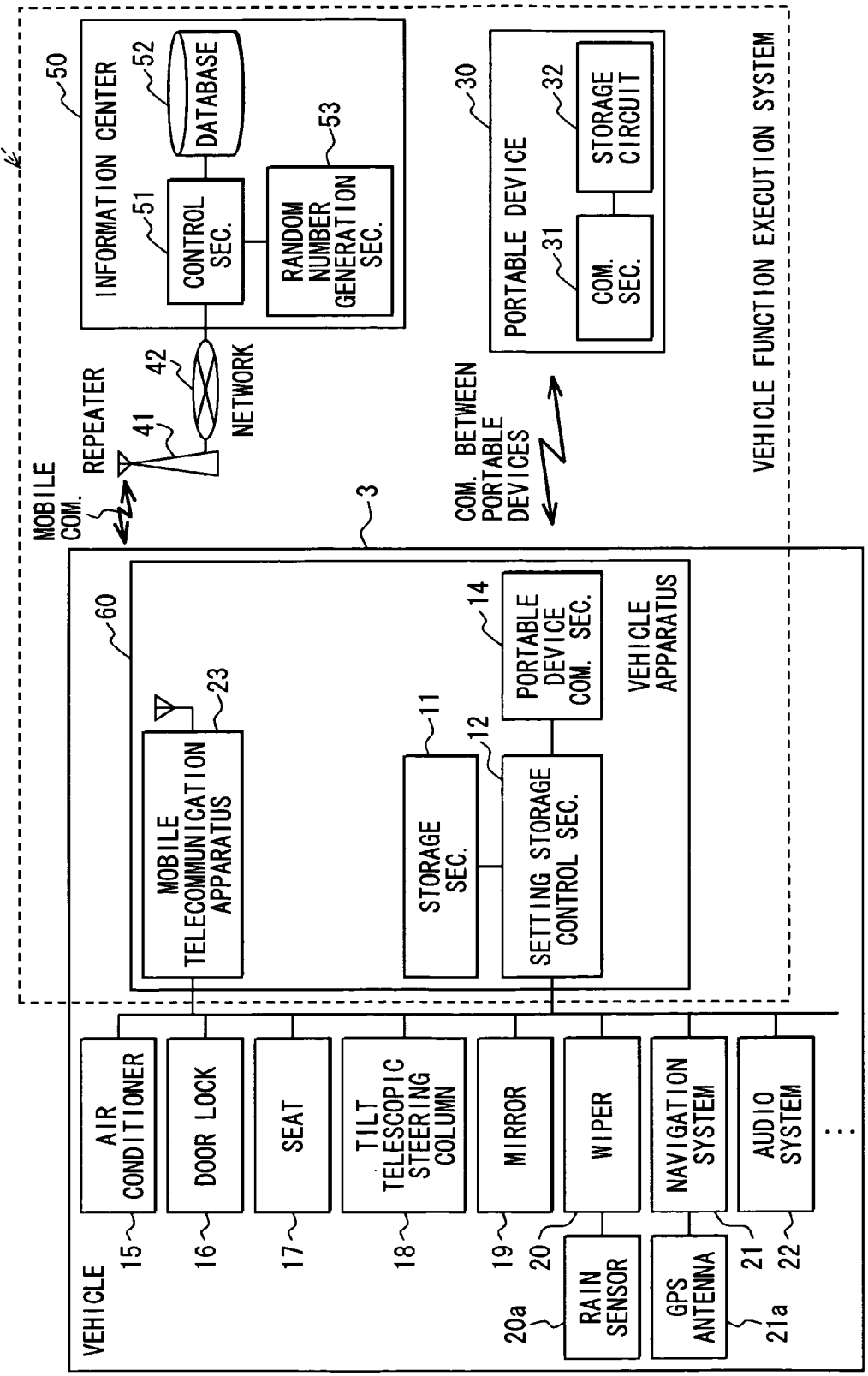
FIG. 10 is a block diagram illustrating an exemplary overall construction of a vehicle function execution system according to a third embodiment.

The vehicle function execution system 300 according to the third embodiment is shown and described in connection with the block diagram and overall construction shown in FIG. 10. It should be noted that many parts of the third embodiment are common to the first and second embodiments. The mutually corresponding parts in the third, first, and second embodiments are designated by the same reference numerals and a detailed description is omitted for simplicity.

The vehicle 3 includes a vehicle apparatus 60, the air conditioner 15, the door lock 16, the seat 17, the tilt telescopic steering column 18, the mirror 19, the wiper 20, the navigation system 21, and the audio system 22. The air conditioner 15, the door lock 16, the seat 17, the tilt telescopic steering column 18, the mirror 19, the wiper 20, the navigation system 21, and the audio system 22 are individually connected to the setting storage control section 12 of the vehicle apparatus 60 and can exchange various types of data with the setting storage control section 12.

The vehicle apparatus 60 includes the storage section 11, the setting storage control section 12, the portable device communication section 14, and a mobile telecommunication apparatus 23. Differently from the vehicle apparatus 40 according to the second embodiment, the vehicle apparatus 60 does not include the random number generation section 13. The storage section 11, the portable device communication section 14, and a mobile telecommunication apparatus 23 are connected to the setting storage control section 12 and can exchange various types of data with the setting storage control section 12.

The portable device 30 includes the communication section 31 and the storage circuit 32. The communication section 31 and the storage circuit 32 are connected to each other and can exchange various types of data.

The information center 50 manages information such as history of purchase, drinking, and eating of the driver. The information center 50 includes the control section 51, the database 52, and a random number generation section 53. The database 52 and the random number generation section 53 are independently connected to the control section 51 and can exchange various types of data with the control section 51. The random number generation section 53 generates and outputs random numbers. The random number generation section 53 can function as the random number generation means according to the embodiment.

The following describes a vehicle setting value storage process performed, for example, by the setting storage control section 12 of the vehicle apparatus 60 with reference to a flow chart in FIG. 11A. The process is repeated when the vehicle apparatus 60 is turned on. When the ignition is determined to be turned off, corresponding to NO at S605, the process waits until the ignition is determined to be turned on. When the ignition is determined to be turned on, corresponding to YES at S605, the process determines whether the vehicle apparatus 10 is communicating with the portable device 30 at S610. When the vehicle apparatus 10 is determined not to communicate with the portable device 30, corresponding to NO at S610, the process waits until the vehicle apparatus 10 is determined to communicate with the portable device 30. When the vehicle apparatus 10 is determined to communicate with the portable device 30, corresponding to YES at S610, the process reads the key ID at S615. Specifically, the process receives the key ID from the portable device 30. The key ID is contained in the setting data stored in the storage circuit 32 of the portable device 30.

The process references the scenario condition, as shown for example, in FIG. 5B stored in the storage section 11 and determines scenarios such as season, time, weather, and location at S620. As an example, the present season is winter and the time and the date are 12:30 on Jan. 1, 2007 respectively. The present location is at longitude EE degrees east and latitude NN degrees north. The weather is snowy. The process then transmits the scenario condition and the key ID to the information center 50 at S625. The process receives a setting value or setting data as shown, for example, in FIG. 5A, from the information center 50. The database 52 of the information center 50 stores the setting data. The process notifies the received setting data or setting content at S635. Specifically, a display of the navigation system 21 is used to visually or audibly notify a function that is permitted for execution as the setting content.

The process determines whether to cancel the setting change at S640. As shown in FIG. 2, a display apparatus of the navigation system 21 displays a notification for determining whether to cancel the setting change in functions such as the automatic mirror function, for example. The process accepts a result of the determination by the user whether or not to cancel the setting change. Based on the accepted user selection result, the process determines whether or not to cancel the setting change. When it is determined that the setting change is canceled, corresponding to YES at S640, the process transmits a notification about the disabled setting change to the information center 50 at S675 and proceeds to S650. When it is determined that the setting change is not canceled, corresponding to YES at S660, the process transmits a notification about the enabled setting change to the information center 50 at S645 and proceeds to S650.

At S650, the process determines whether setting data is received from the information center 50. When it is determined that that no setting data is received from the information center, corresponding to NO at S650, the process waits until setting data is determined to be received from the information center 50. When it is determined that setting data is received from the information center, corresponding to YES at S650, the process writes the received setting data to the targeted part of the setting data stored in the storage section 11 at S655.

The process determines whether the ignition turns off at S660. When the ignition is determined to be turned on, corresponding to NO at S660, the process waits until the ignition is determined to be turned off. When the ignition is determined to be turned off, corresponding to YES at S660, the process reads the setting data at S665. The process transmits the key ID and the setting data to the information center 50 at S680. The process then terminates.

The following describes a portable device setting value storage process performed by the portable device 30 with reference to a flow chart in FIG. 11B when the portable device 30 is turned on. When it is determined that the portable device 30 does not communicate with the vehicle apparatus 10, corresponding to NO at S710, the process waits until the portable device 30 is determined to communicate with the vehicle apparatus 10. When it is determined that the portable device 30 communicates with the vehicle apparatus 10, corresponding to YES at S710, the process reads the key ID contained in the setting data stored in the storage circuit 32. The process transmits the read key ID to the vehicle apparatus 10 at S720. The process then returns to S710.

Figure 12:
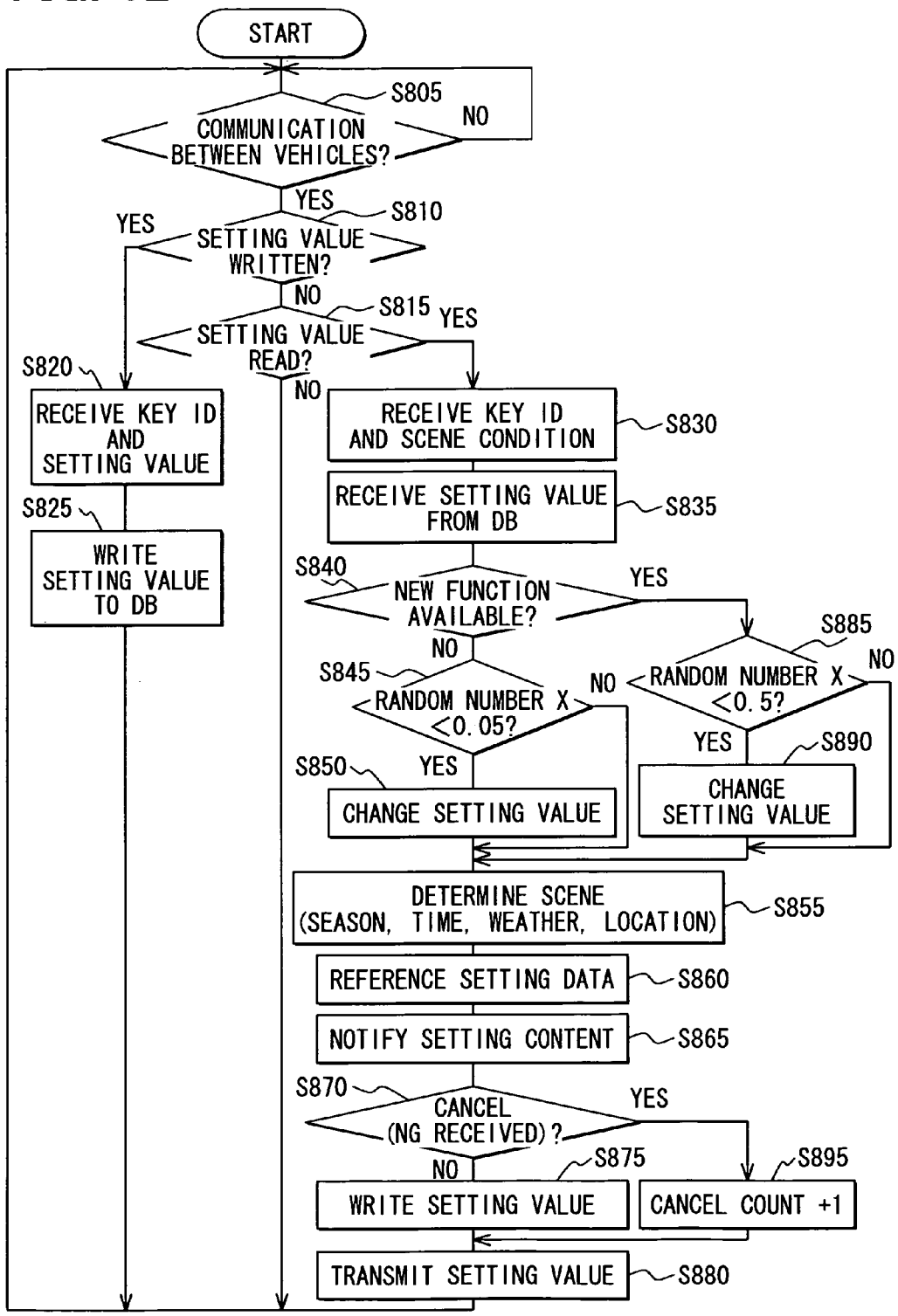
FIG. 12 is a flow chart illustrating an exemplary center setting value storage process.

The following describes a center setting value storage process performed by the control section 51 of the information center 50 with reference to a flow chart in FIG. 12. The process is performed when the information center 50 is turned on.

The process determines whether the information center 50 communicates with the vehicle apparatus 10 at S805. When it is determined that the information center 50 does not communicate with the vehicle apparatus 10, corresponding to NO at S805, the process waits until the information center 50 is determined to communicate with the vehicle apparatus 10. When it is determined that the information center 50 communicates with the vehicle apparatus 10, corresponding to YES at S805, the process determines whether setting data is written to the vehicle apparatus 10 at S810. When it is determined that setting data is written to the vehicle apparatus 10, corresponding to YES at S810, the process receives the updated setting data and key ID from the vehicle apparatus 10 at S820. The process writes the received updated setting data and key ID to the setting data stored in the database 52 at S825 and returns to S805.

When it is determined that no setting data is written to the vehicle apparatus 10, corresponding to NO at S810, the process determines whether to read setting data from the information center 50 at S815. The process returns to S805 when it is determined that no setting data is read from the information center 50, corresponding to NO at S815. When it is determined that setting data is read from the information center 50, corresponding to YES at S815, the process receives the key ID and the setting data from the vehicle apparatus 60 at S830 and reads the setting data from the database 52 at S835.

The process references the received key ID and setting data and the read setting data and determines whether a new function is available for the in-vehicle units at S840. When it is determined that no new function is available for the in-vehicle units, corresponding to NO at S840, the process proceeds to S845 and determines whether random number X generated by the random number generation section 13 is smaller than 0.05. When the random number X is smaller than 0.05, corresponding to YES at S845, the process references the setting data received from the vehicle apparatus 60 and changes the targeted part of the setting data stored in the database 52 at S850, see FIG. 5A. Specifically, the process compares two pieces of the read setting data. When a comparison result shows a difference between both, the process generates setting data by combining the two pieces of setting data, as shown for example, in FIG. 5C. The process references the generated setting data and changes the targeted part of the setting data stored in the database 52. The process permits execution of the function based on the setting data read from the storage section 11 of the vehicle apparatus 10. The process then proceeds to S855. When random number X generated by the random number generation section 13 is greater than or equal to 0.05, corresponding to NO at S845, the process jumps to S855.

When it is determined that a new function is available for the in-vehicle units, corresponding to YES at S840, the process proceeds to S885 to determine whether random number X generated by the random number generation section 13 is smaller than 0.5. When random number X is smaller than 0.5, corresponding to YES at S885, the process references the setting data received from the vehicle apparatus 60 and changes the targeted part of the setting data stored in the database 52 at S890, see FIG. 5A. Specifically, the process compares two pieces of the read setting data. When a comparison result shows a difference between both, the process determines that a new function is added to either. The process generates setting data by combining the two pieces of setting data as shown for example in FIG. 5C, when a difference is determined between both including addition of the new function. The process references the generated setting data and changes the targeted part of the setting data stored in the database 52. The process permits execution of the functions including the new function based on the setting data read from the storage section 11 of the vehicle apparatus 60. The process proceeds to S855. When random number X generated by the random number generation section 13 is greater than or equal to 0.5, corresponding to NO at S885, the process jumps to S855.

At S855, the process references the scenario condition as shown for example in FIG. 5B received from the vehicle apparatus 60 and determines scenarios such as season, time, weather, and location. As an example, the present season is winter. The date and the time are 12:30 on Jan. 1, 2007. The present location is at longitude EE degrees east and latitude NN degrees north. The weather is snowy. The process then references the setting data received from the vehicle apparatus 60 at S860 and notifies the setting content at S865. Specifically, a display of the navigation system 21 is used to visually or audibly notify a function that is permitted for execution as the setting content. The process determines whether to cancel the setting change at S870. As shown in FIG. 2, a display apparatus of the navigation system 21 displays a notification for determining whether to cancel the setting change in functions such as the automatic mirror function, for example. The process accepts a result of the determination by the user whether to cancel the setting change. Based on the accepted user selection result, the process determines whether to cancel the setting change. When it is determined that the setting change is canceled, corresponding to YES at S870, the process increments the cancellation count for the corresponding setting item by 1 at S895, see FIG. 5A and proceeds to S880. When it is determined that the setting change is not canceled, corresponding to NO at S870, the process writes the targeted part of the setting data stored in the database 52 at S875 and proceeds to S880. At S880, the process reads setting data stored in the database 52, transmits the read setting data to the vehicle apparatus 60, and then returns to S805.

The vehicle function execution system 300 according to the third embodiment provides the same effects as those provided by the vehicle function execution system 100 according to the first embodiment.

Other Embodiments

While there have been described specific preferred embodiments of the present invention, it is to be distinctly understood that the present invention is not limited thereto but may be otherwise variously embodied within the spirit and scope of the invention.

For example, according to various embodiments, the vehicle setting value storage process allows a display apparatus of the navigation system 21 to display a notification for determining whether to cancel the setting change in functions such as an automatic mirror function, for example. The process accepts a result of the determination by the user whether to cancel the setting change. Based on the accepted user selection result, the process determines whether to cancel the setting change at S150. When it is determined that the setting change is canceled, corresponding to YES at S150, the process increments the cancellation count. When the cancellation count reaches a specified value, the setting data concerning the function may not subsequently be updated. A function can be assumed to be unnecessary for the user when the function is canceled for the specified number of times. It is therefore possible to permit execution of functions suited for user preferences and exclude unsuited ones.

Further, according to various embodiments, the vehicle setting value storage process accepts a user selection result regarding whether or not to cancel the setting change. Based on the accepted user selection, the process determines whether or not to cancel the setting change. When the setting change is not canceled, the targeted part of the setting data is written. After execution of the function is permitted, a notification is displayed for determining whether to cancel the setting change concerning the function. The process may accept a result of the user selection whether or not to cancel the setting change. Based on the accepted user selection, the process may determine whether to cancel the setting change. Information associated with the determination of whether or not the setting change is to be canceled is written to the targeted part of the setting data stored, for example, in the storage section 11. The intention of the user can be reflected on continued permission or cancellation of execution of the vehicle functions.

When the setting data is updated as mentioned above, the update content may be saved as a history. When the user does not accept the changed content, the history may be invoked to cancel the setting. The setting may be restored to the content before the update. The setting content before the update may be prevented from being modified for a specified time period. The setting content can be modified after expiration of the specified time period. When the user often cancels the update such as three times successively, the setting item may not be updated subsequently.

While in connections with various embodiments described herein a function of the used vehicle is compared with a function of the in-use vehicle, the invention is not limited thereto. The functions of the same vehicle may be compared in different exemplary scenarios as follows. A navigation function "railroad crossing guidance" can be provided for a less frequented route and not provided for a frequented route. A light control system can be always turned on in a rainy condition to improve the visibility against surroundings. The seat position can be moved toward the steering wheel afternoon because a driver seems to get more tired. An air cleaner is operated in spring because the amount of pollen is expected to increase. A vehicle speed for the cruise control is set to lower in a snowy or rainy day than a clear day.

In the above described cases, a scenario-based setting change table as shown for example in FIG. 6 can be referenced to permit execution of the functions registered for scenarios such as seasons, times, weathers, and places in accordance with the setting contents such as setting items and setting values.

What is claimed is:

1. A vehicle function execution system comprising:
   a first storage means for storing a first setting data concerning a first function associated with a previously used vehicle when the first storage was coupled to the previously used vehicle;
   a second storage means mounted on an in-use vehicle for storing a second setting data concerning a second function associated with an in-use vehicle, the in-use vehicle used after the previously used vehicle;
   a read means for reading the first setting data stored in the first storage means when the first storage means is coupled to the in-use vehicle and the second setting data stored in the second storage means when a user uses the in-use vehicle;
   a comparison means for comparing the first setting data with the second setting data read by the read means;
   a permission means for permitting execution of the first function based on the first setting data read by the read means when a difference is found between the first setting data and the second setting data by the comparison means; and
   an acceptance means for accepting a user input via an operation means,
   wherein the permission means permits execution of the first function in accordance with a positive input accepted by the acceptance means and does not permit execution of the first function in accordance with a negative input accepted by the acceptance means,
   wherein the first storage means updates the first setting data unless the permission means cancels execution of the first function a specified number of times in accordance with the user input accepted by the acceptance means.

2. A vehicle function execution system comprising:
   a first storage means for storing a first setting data concerning a first function associated with a previously used vehicle when the first storage was coupled to the previously used vehicle;
   a second storage means mounted on an in-use vehicle for storing a second setting data concerning a second function associated with an in-use vehicle, the in-use vehicle used after the previously used vehicle;
   a read means for reading the first setting data stored in the first storage means when the first storage means is coupled to the in-use vehicle and the second setting data stored in the second storage means when a user uses the in-use vehicle;
   a comparison means for comparing the first setting data with the second setting data read by the read means;
   a permission means for permitting execution of the first function based on the first setting data read by the read means when a difference is found between the first setting data and the second setting data by the comparison means, the permission means displays a notification for determining whether or not to cancel a setting change of the first function that is permitted for execution instead of storing the setting change of the first function to the second storage means when the difference is found, wherein the permission means permits execution of a function when the difference is found and a specific condition is satisfied; and
   a random number generation means for generating random numbers, wherein the permission means determines that the specified condition is satisfied when a random number generated by the random number generation means is greater than or equal to a specified value.

3. A portable device capable of use in a vehicle function execution system of a vehicle that is in-use, the portable device comprising:
   a first memory for storing a first setting data including a first function associated with a previously used vehicle, the first setting data being stored when the portable device was coupled to the previously used vehicle;
   a reader interface capable of coupling with a reader mounted on the vehicle that is in-use, the reader configured to:
      read the first setting data when the portable device is coupled thereto;
      read a second setting data stored in a second memory mounted on the vehicle that is in-use, the second memory storing the second setting data including a second function associated with a vehicle second storage means;
      compare the first setting data with the second setting data read by the reader interface; and
      permit execution of the first function based on the first setting data read by the reader interface when a difference is found between the first setting data and the second setting data by the comparison of the first setting data with the second setting data,
   wherein the reader permits execution of the first function in accordance with a positive input from an input device and does not permit execution of the first function in accordance with a negative input from the input device,
   wherein the first setting data is not updated in the first storage means, instead of updating the first setting data, when execution of the first function is canceled a specified number of times.

* * * * *